United States Patent
Wakeman

(10) Patent No.: US 10,260,444 B2
(45) Date of Patent: Apr. 16, 2019

(54) DIRECT INJECTION FUEL SYSTEM WITH CONTROLLED ACCUMULATOR ENERGY STORAGE

(71) Applicant: Russell J Wakeman, Canton, MI (US)

(72) Inventor: Russell J Wakeman, Canton, MI (US)

(73) Assignee: FCA US LLC, Auburn Hills, MI (US)

( * ) Notice: Subject to any disclaimer, the term of this patent is extended or adjusted under 35 U.S.C. 154(b) by 1246 days.

(21) Appl. No.: 14/133,922

(22) Filed: Dec. 19, 2013

(65) Prior Publication Data
US 2015/0176516 A1    Jun. 25, 2015

(51) Int. Cl.
| | | |
|---|---|---|
| F02B 3/00 | (2006.01) | |
| F02D 41/38 | (2006.01) | |
| B60T 1/10 | (2006.01) | |
| F02M 63/02 | (2006.01) | |
| F16D 61/00 | (2006.01) | |
| F02D 41/04 | (2006.01) | |
| F02D 41/12 | (2006.01) | |

(52) U.S. Cl.
CPC .......... F02D 41/3836 (2013.01); B60T 1/10 (2013.01); F02M 63/0225 (2013.01); F16D 61/00 (2013.01); F02D 41/042 (2013.01); F02D 41/12 (2013.01); F02D 2041/389 (2013.01); F02M 2200/40 (2013.01); F02M 2200/60 (2013.01)

(58) Field of Classification Search
USPC ....................................................... 123/294
See application file for complete search history.

(56) References Cited

U.S. PATENT DOCUMENTS

| | | | | |
|---|---|---|---|---|
| 4,884,545 A * | 12/1989 | Mathis | ................ | F02D 41/3845 |
| | | | | 123/446 |
| 5,771,865 A * | 6/1998 | Ishida | .................... | F02M 45/04 |
| | | | | 123/300 |
| 6,095,118 A * | 8/2000 | Klinger | .............. | F02M 63/0225 |
| | | | | 123/446 |
| 6,095,774 A * | 8/2000 | Tanaka | ................... | F02M 55/04 |
| | | | | 417/540 |
| 6,209,525 B1 * | 4/2001 | Konishi | ................ | F02M 55/04 |
| | | | | 123/458 |

(Continued)

FOREIGN PATENT DOCUMENTS

WO       2009152876       12/2009

*Primary Examiner* — Lindsay Low
*Assistant Examiner* — Ruben Picon-Feliciano
(74) *Attorney, Agent, or Firm* — Ralph E Smith

(57) ABSTRACT

A direct injection fuel supply system, in one exemplary implementation, includes a lift fuel pump, a positive displacement pump, at least one fuel injector and an accumulator assembly. The lift pump is adapted to be in fluid communication with a supply of fuel and the positive displacement pump is in fluid communication with and downstream of the lift pump. The at least one injector is in fluid communication with an outlet of the positive displacement pump via a high pressure fuel line. The accumulator assembly includes an accumulator and a valve, where the valve is in direct fluid communication with the high pressure fuel line and the injector. The valve is selectively controlled to at least one of an open state providing fluid communication between the accumulator and the high pressure fuel line and a closed state blocking fluid communication between the accumulator and the high pressure fuel line.

17 Claims, 1 Drawing Sheet

(56) References Cited

U.S. PATENT DOCUMENTS

| | | | |
|---|---|---|---|
| 6,234,148 B1* | 5/2001 | Hartke | F02D 41/222 123/198 D |
| 6,253,734 B1* | 7/2001 | Rembold | F02D 41/3845 123/446 |
| 6,293,251 B1* | 9/2001 | Hemmerlein | F02D 41/222 123/357 |
| 6,360,722 B1* | 3/2002 | Onishi | F02M 55/00 123/446 |
| 7,757,669 B2* | 7/2010 | Okamoto | F02D 41/3845 123/508 |
| 7,900,602 B2* | 3/2011 | Petrone | F02M 37/0029 123/446 |
| 9,188,069 B2* | 11/2015 | Steffen | F02D 19/0647 |
| 9,664,157 B2* | 5/2017 | Hu | F02M 41/00 |
| 2003/0192508 A1 | 10/2003 | Kishimoto | |
| 2004/0267433 A1* | 12/2004 | Asano | F02D 41/123 701/104 |
| 2007/0283934 A1* | 12/2007 | Okamura | F02D 41/3845 123/495 |
| 2008/0216797 A1* | 9/2008 | Oono | F02D 41/062 123/447 |
| 2011/0209687 A1* | 9/2011 | Schroeder | F02M 63/005 123/459 |
| 2012/0097134 A1* | 4/2012 | Dolker | F02D 41/3863 123/511 |
| 2012/0240669 A1* | 9/2012 | Nishigaki | F02D 41/221 73/114.45 |
| 2013/0118449 A1* | 5/2013 | Marriott | F02M 43/02 123/304 |
| 2014/0165965 A1 | 6/2014 | Wakeman | |
| 2014/0224209 A1* | 8/2014 | Pursifull | F02M 63/0001 123/294 |
| 2015/0159576 A1* | 6/2015 | Surnilla | F02D 41/3082 701/103 |

\* cited by examiner

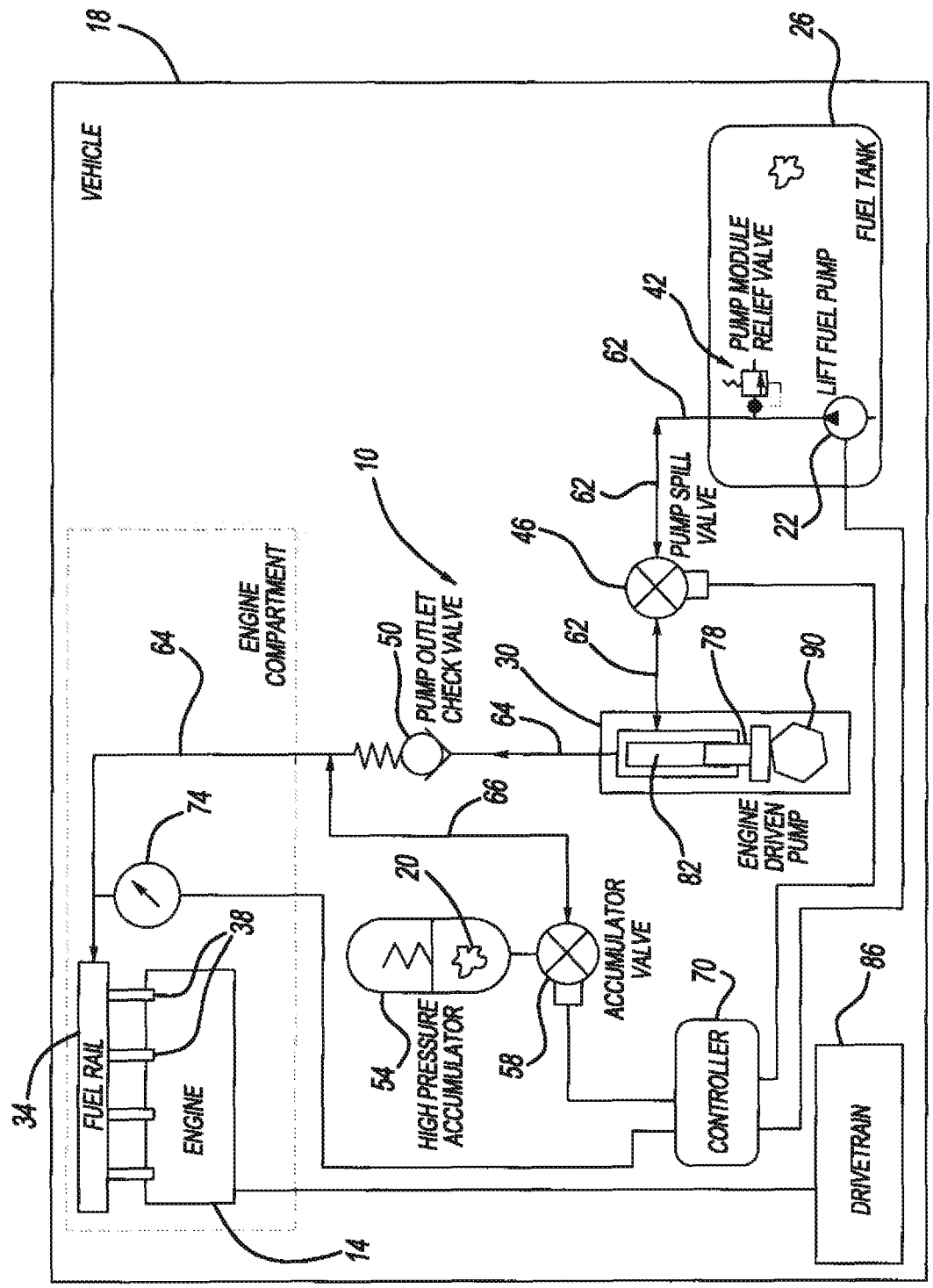

ively in the fuel system for a vehicle having controlled accumulator energy storage.

DIRECT INJECTION FUEL SYSTEM WITH CONTROLLED ACCUMULATOR ENERGY STORAGE

FIELD

The present disclosure relates generally to a direct injection fuel system and, more particularly, to a direct injection fuel system for a vehicle having controlled accumulator energy storage.

BACKGROUND

A typical fuel supply system for a port fuel injected internal combustion engine includes an electric fuel pump that conveys fuel being stored in a fuel tank through a fuel supply line to a fuel injector on the engine. As the engine operates, the fuel pump is activated to provide a continuous supply of fuel to the engine. However, an engine's fuel consumption varies greatly with its required output. In order to ensure that the engine is always provided with adequate fuel, the electric fuel pump is typically designed to provide fuel to the engine at the rate required for maximum engine output. More fuel is required during times of higher engine demand and less fuel during times of lesser engine demand, or during idling. Such low pressure fuel systems have incorporated passive accumulators to accumulate excess fuel supplied by the electric fuel pump during times of non-peak engine output.

While these accumulators in port fuel injection systems work for their intended purpose, they are passive accumulators associated with low pressure fuel systems. Such accumulators are not in direct fluid communication with the fuel injectors and are not associated downstream of a positive displacement pump on the high pressure side of a direct injection fuel system. As a result, these typical accumulator arrangements are not effective for directly supplying pressurized fuel to the injectors of a direct injection system, which can be advantageous during a restart of a start-stop direct injection engine system. Further, such conventional accumulators in the low pressure PFI fuel systems with electric fuel pumps are not capable of harvesting pressurized fuel during engine shutdown after a key-off event.

SUMMARY

In one form, a direct injection fuel supply system for a vehicle is provided in accordance with the teachings of the present disclosure. The direct injection fuel supply system, in one exemplary implementation, includes a lift fuel pump, a positive displacement pump, at least one accumulator and an accumulator assembly. The lift fuel pump is adapted to be in fluid communication with a supply of fuel and the positive displacement pump is in fluid communication with and downstream of the lift fuel pump. The at least one fuel injector is in fluid communication with an outlet of the positive displacement pump via a high pressure fuel line. The accumulator assembly includes an accumulator and a valve, where the valve is in direct fluid communication with the high pressure fuel line and the at least one fuel injector. The valve is configured to be controlled to at least one of an open state providing fluid communication between the accumulator and the high pressure fuel line and a closed state blocking fluid communication between the accumulator and the high pressure fuel line.

In another form, a method for controlling a direct injection fuel supply system is provided in accordance with the teachings of the present disclosure. The method includes, in one exemplary implementation, monitoring, by a controller, an operating state of an engine and determining, by the controller, that the engine is operating in a deceleration state or a shutdown state. An accumulator valve fluidly coupled to an accumulator is commanded, by the controller, to open to allow pressurized fuel from a mechanically driven positive displacement pump to flow into the accumulator, where the accumulator valve fluidly is coupled to a high pressure fuel line that is in fluid communication with an output of the displacement pump and at least one fuel injector. The accumulator valve is commanded, by the controller, to close at or proximate an end of the deceleration or shutdown state thereby storing pressurized fuel in the accumulator. The accumulator valve is fluidly coupled to the high pressure fuel line in direct fluid communication with the at least one fuel injector and, when commanded to open by the controller, allows the accumulator to supply pressurized fuel directly to the at least one fuel injector.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 1 is a schematic view of an exemplary automotive direct injection fuel supply system having controlled accumulator energy storage according to the principles of the present disclosure.

DESCRIPTION

Turning now to the drawings, an exemplary direct injection (DI) fuel supply system having controlled accumulator energy storage is schematically shown and generally identified in FIG. 1 at reference numeral 10. As shown, the DI fuel supply system 10 is associated with an exemplary engine 14 and vehicle 18. As will be discussed in greater detail below, the DI fuel supply system 10 advantageously utilizes a mechanically driven (e.g., by engine 14) positive displacement pump to harvest pressurized fuel 20 in a high pressure accumulator during a vehicle/engine coast or deceleration event, thereby not incurring any immediate energy losses (as the energy driving the positive displacement pump is produced by the inertia of the vehicle 18 and not by running the engine 14). Conventional low pressure fuel systems, such as port fuel injection systems with electric fuel pumps, cannot provide such energy storage without incurring energy losses (e.g., continued power to electric fuel pump).

As will also be discussed in greater detail below, the DI fuel supply system 10 of the present disclosure includes the accumulator on the high pressure side or section of the system downstream of the positive displacement pump and in direct fluid communication with the fuel rail (i.e., the fuel injectors). This arrangement provides the ability to directly supply pressurized fuel to the fuel injectors from the accumulator without requiring fuel from the fuel pump, which is advantageous on a restart of a DI engine system. Further, by including a control valve with the accumulator in the above-discussed exemplary implementation, the accumulator can be controlled to not only solely provide pressurized fuel to the injectors for operation of the engine, but also to absorb pressure pulsations in the fuel rail. These and other exemplary features of DI fuel supply system 10 will be discussed in greater detail below.

With continuing reference to FIG. 1, an example architecture of the DI fuel system 10 includes lift fuel pump 22 disposed in or proximate to a fuel tank 26 for supplying fuel at a low or lower pressure to an engine-driven positive displacement mechanical fuel pump 30. In one implementation, lift fuel pump 22 is an electric fuel supply pump. As will be discussed in greater detail below, the positive displacement pump 30 provides high pressure fuel to a fuel rail 34 and fuel injectors 38 associated therewith at the significantly higher pressures required for a direct injection system. For example only, gasoline direct injection fuel systems typically operate at an injection pressure much higher than conventional port fuel injected (PFI) systems (that use only the low pressure electric fuel pump 22 or equivalent), often at a level approximately 50 times the pressure of the conventional PFI system (e.g., 200 bar vs. 4 bar).

The lift fuel pump 22 and the positive displacement pump 30 are in fluid communication with a pump relief valve 42, a pump spill valve 46, a pump outlet check valve 50, a high pressure accumulator 54 and accumulator valve 58, as well as the fuel rail 34 and fuel injectors 38. In the exemplary implementation illustrated in FIG. 1, the pump spill valve 46 and accumulator valve 58 are solenoid valves. In one exemplary implementation, the accumulator valve 58 can be a digital valve generally controlled to open or closed positions, or a linear valve, which can provide potential NVH improvement over digital valves as well as greater operational control.

In one exemplary implementation, the fluid communication within the DI fuel system 10 is provided by fuel supply lines 62, 64 and 66. In the exemplary implementation shown in FIG. 1, the system includes only two pumps—the electric lift fuel pump 22 and the engine driven positive displacement pump 30. A controller 70, such as an engine or powertrain controller, monitors and/or controls the lift fuel pump 22, pump spill solenoid valve 46, accumulator solenoid valve 58 and a fuel rail pressure sensor 74, as schematically shown in FIG. 1 and will be discussed in greater detail below.

In DI fuel supply system 10, the spill valve 46 in conjunction with the controller 70 regulates the pressure in the fuel rail 34 by controlling the inlet and the start of pumping of the positive displacement pump 30. In the exemplary implementation of the positive displacement pump 30 illustrated in FIG. 1, the spill valve 46 can control the inlet and start of pumping during the cycle of a mechanical plunger 78 of the positive displacement pump 30. With the spill valve 46 open during a charging stroke of the pump 30, the full swept volume of the plunger 78 is inducted into the pump 30. During the pumping stroke of the plunger 78, the spill valve 46 remains open, which allows the plunger 78 to force fuel back to the fuel tank 26 until the required amount of fuel remains in the plunger chamber 82. Closing the spill valve 46 at this point allows the rising plunger 78 to raise the pressure of the remaining fuel and deliver the fuel through the check valve 50 to the fuel rail 34 and thus the injectors 38. In this manner, pumping work is reduced to the minimum necessary to deliver the desired quantity of fuel at the desired pressure to the fuel rail 34.

Positioning the high pressure accumulator 54 downstream of the mechanical positive displacement pump 30 and check valve 50 (i.e., in the high pressure section of the DI fuel supply system 10) as shown in FIG. 1 provides for the ability to store fuel pump energy as pressurized fuel under conditions where the inertia of the vehicle 18 drives the engine 14 through the drivetrain 86 and thus the engine driven positive displacement pump 30 directly. Thus, under these conditions (e.g., vehicle/engine coast and/or deceleration), the energy driving the pump 30 is not necessarily produced by running the engine 14, which is not typically being fueled during deceleration or downhill coasting, and is thus directly harvested from the inertial movement of the drivetrain 86 with no immediate losses. Further, positioning the accumulator 54 in direct fluid communication with fuel rail 34 provides the ability for the accumulator 54 to selectively supply pressurized fuel directly to the fuel rail 34 and rapidly change the pressure in fuel rail 34 in a more rapid manner than by a positive displacement fuel pump. In one exemplary implementation, direct fluid connection with fuel rail 34 can mean no other components are fluidly connected to the fuel line 64 between the connection of fuel line 66 therewith and fuel rail 34/injectors 38, except for the optional placement of fuel rail pressure sensor 74 shown in FIG. 1.

The fuel pressure energy can be stored using the mechanical pump 30 at full capacity to pressurize fuel and store it in the accumulator 54 with the solenoid valve 58 controlling fluid connection between the fuel supply system and the fuel pressure storage in accumulator 54, as will be discussed in greater detail below. The accumulator 54 can be any type of accumulator capable of handling pressures greater than the operating pressure of the DI fuel supply system 10, including, but not limited to, a metal bellows type accumulator or a spring type accumulator.

Positioning the accumulator 54 in the high pressure section of the DI fuel supply system 10 (e.g., connected with high pressure fuel line 64 downstream of pump 30) provides the ability to harvest and/or save significantly more energy than in a conventional PFI fuel system. For example, since pumping work is the product of flow rate and pressure, the high pressure section of the DI fuel supply system 10 requires approximately 50 times the amount of work to pressurize the same flow rate as compared to a conventional PFI fuel system (e.g., 200 bar vs. 4 bar). As a result, there is significantly more energy to be harvested/stored in the high pressure section of the DI fuel supply system 10 as compared to the PFI fuel system. Further, positioning the accumulator 54 in the high pressure section using a separate fuel line 66 (or other intersecting connection) provides for maximum flexibility in selectively utilizing or bypassing accumulator 54. In other words, configuring DI fuel supply system 10 such that accumulator 54 is not positioned in-line with fuel line 64 provides for greater flexibility in engine and fuel control strategies because, for example, accumulator 54 can be selectively utilized and/or bypassed.

It should be appreciated that while the accumulator 54 is shown in FIG. 1 positioned between the fuel rail 34 and positive displacement pump 30, the accumulator 54 can be positioned in other locations in the high pressure section of DI fuel supply system 10 so long as the accumulator 54 and associated solenoid valve 58 are in direct fluid communication with fuel rail 34 downstream of pump 30 and check valve 50. Non-limiting examples of alternative positions include downstream of fuel rail 34 and directly connected to fuel rail 34. It should also be appreciated that within the high pressure section of the DI fuel supply system 10, there may be one or more optimal connection locations for the accumulator 54 and valve 58 from an acoustical perspective. For example, the connection of line 66 can be positioned at a location along high pressure line 64 where it has been determined (through testing, development, etc.) that the acoustic resonances have a peak.

In operation, the accumulator 54 in conjunction with the accumulator valve 58 (also referred to as an accumulator assembly) is controlled by controller 70 to selectively allow pressurized fuel to flow into accumulator 54 and selectively release the pressurized fuel directly to the fuel rail 34 according to various control algorithms and/or strategies, examples of which are discussed below. In this regard, controller 70 can monitor operation of engine 14, vehicle 18 and various other sensors, features and/or components in communication therewith, such as those shown in the exemplary system schematically illustrated in FIG. 1.

In one implementation, when the vehicle 18 is operating under a deceleration event, the accumulator 54 is pumped up to a maximum allowable pressure or the highest attainable pressure during the duration of the deceleration event from negative torque applied to the engine 14 by vehicle 18 inertia. In this implementation, the controller 70 commands the lift pump 22 to be on while commanding the spill valve 46 to be open during the induction stroke of the pump 30 and closed during the full pumping stroke of pump 30 to maximize flow into the accumulator 54. In this regard, the controller 70 also commands accumulator valve 58 to be open during deceleration such that pressurized fuel from pump 30 can flow into accumulator 54 until the pressure in accumulator 54 reaches a predetermined threshold.

In one implementation, the controller 70 receives a pressure signal from the fuel rail pressure sensor 74 and compares this signal to the predetermined threshold. Positioning the accumulator 54 in direct fluid communication with fuel rail 34 and downstream of positive displacement pump 30 and check valve 50 provides for utilization of fuel rail pressure sensor 74 to determine the pressure in accumulator 54 thereby eliminating the need for an additional accumulator pressure sensor. If the pressure signal received by controller 70 is below the predetermined threshold, the accumulator valve 58 remains open during the deceleration event and is commanded to close by controller 70 upon completion of the deceleration event or if the pressure signal exceeds the predetermined threshold. If the accumulator valve 58 is commanded to close by controller 70 before completion of the deceleration event, the lift pump 22 is commanded by controller 70 to turn off and the spill valve 46 is commanded to open in order to avoid over pressuring the fuel rail 34.

At engine 14 shutdown (e.g., where a key-off signal or equivalent is received by controller 70), in one exemplary implementation, the lift pump 22 is commanded by controller 70 to an off state and the accumulator valve 58, to the extent open, is commanded to close to trap and/or store pressurized fuel for a subsequent cold or warm engine 14 start/restart. In one exemplary implementation, the engine 14 is controlled to stop at a particular crank angle in an effort to facilitate a rapid restart. In this scenario, the DI fuel supply system 10 is controlled to deadhead positive displacement pump 30 (e.g., fuel injectors 38 in an off state, spill valve 46 closed, and accumulator valve 58 commanded to close at a calibrated time) thereby creating high resistance to rotation of pump 30 at a particular crank angle by sharply raising fuel system pressure as the pump plunger 78 rises on the next pump cam lobe 90.

With rapid pressurization of fuel rail 34 available from accumulator 54 on restart, pressure in the fuel rail 34 can optionally be allowed to fall or bleed down at shutdown or initiation of shutdown, thereby reducing a potential for fuel injector 38 leakage during an engine-off period that could potentially contribute to evaporative emissions. In addition, engine 14 coast down energy can be harvested by accumulator 54 during shutdown for the next restart since the positive displacement pump 30 is mechanically driven and will function as the engine 14 coasts down to zero speed on shutdown. Conventional PFI fuel systems and/or other fuel systems with only electric fuel pumps cannot perform this function as such pumps stop functioning upon key-off.

Accumulator valve 58 can then be controlled, in one exemplary implementation, to provide pressurized fuel harvested from vehicle 18 deceleration energy or shutdown energy (as discussed above) to the fuel rail 34 thereby reducing engine 14 parasitic losses. Pressurized fuel in accumulator 54 can be available during vehicle 18 shutdown (i.e., engine 14 off) without a requirement to crank the engine 14 and/or operate the fuel pump to restart the vehicle 18. This can result in a faster restart because the pressurized fuel from accumulator 54 is available more quickly than can be generated by fuel pumps. Having pressurized fuel from accumulator 54 available upon initiation of a restart provides for more immediate fuel atomization which can result in lower particulate emissions. Further, with placement of accumulator 54 in direct fluid communication with fuel rail 34 downstream of positive displacement pump 30, fuel pressure to the fuel rail 34 can be raised more quickly during transients than by pump 30 alone.

For a vehicle 18 restart event (e.g., where a key-on signal or equivalent is received by controller 70), use of stored pressurized fuel in accumulator 54 enables faster restarts by utilizing immediate or near immediate pressurized fuel available at injection pressure from accumulator 54. One reason for this, as briefly discussed above, is because a longer period of time is required to build injection pressure at fuel rail 34 from positive displacement pump 30. Further, for vehicle 18 cold starts, use of pressurized fuel from accumulator 54 enables faster and cleaner cold starts because the immediate or near immediate fuel at injection pressure in cold ambient temperatures improves fuel atomization and thereby reduces particulate emissions. Without accumulator 54, the positive displacement pump 30 will raise pressure less quickly due at least to slower engine 14 cranking speeds in the cold ambient conditions.

In one implementation when the vehicle 18 is under a restart event and the controller 70 determines that the pressure in accumulator 54 is sufficient to supply pressurized fuel to the injectors 38, the controller 70 commands the lift pump 22 to an on state, the spill valve 46 to open and the accumulator valve 58 to open. As discussed above, the controller 70 can determine the accumulator 54 pressure with the solenoid valve 58 open using the fuel rail pressure sensor 74 signal. When the accumulator solenoid valve 58 is closed, such as just prior to a vehicle 18 restart event, the accumulator 54 pressure can be inferred based on controller 70 storing the fuel rail pressure from fuel rail pressure sensor 74 at the time of the prior closing of solenoid valve 58.

Commanding the accumulator valve 58 to open under restart as discussed above rapidly pressurizes the fuel rail 34 in a manner faster than with positive displacement pump 30. In one implementation, initial injections from fuel injectors 38 are solely from pressurized fuel from accumulator 54, which provides faster restarts and combustion assistance for an engine starter associated with engine 14. As pressurized fuel from accumulator 54 is depleted to a point where controller 70 determines pressure in fuel rail 34 is at or near nominal injector pressure via pressure sensor 74, spill valve 46 is commanded to close to restart supply of pressurized fuel from positive displacement pump 30.

In another implementation, pressurized fuel from accumulator 54 is utilized in conjunction with positive displacement pump 30 for initial restart. One exemplary instance for this operation is when stored fuel in accumulator 54 is below nominal injection pressure but above a predetermined threshold (stored in controller 70) such that pressurized fuel from accumulator 54 can still provide a more rapid engine 14 start than with pump 30 alone.

During steady state operation of the vehicle 18, pressurized fuel stored in accumulator 54 can be selectively utilized based on operating conditions of the engine 14 and the pressure of the stored fuel relative to nominal injection pressure. For example, when pressure in the accumulator 54 is at or above nominal injection pressure, controller 70 commands the lift pump 22 to an off state, the spill valve 46 to open and the accumulator valve 58 to open. Upon the pressure in accumulator 54 falling below nominal injection pressure or a predetermined minimum pressure threshold (as determined via the pressure signal from sensor 74), controller 70 commands lift pump 22 to an on state, spill valve 46 to close and accumulator valve 58 to close thereby resuming normal operation of the positive displacement pump 30 without influence from accumulator 54.

In one exemplary implementation, DI fuel supply system 10 is configured to attenuate fuel rail 34 pressure pulsations generated by positive displacement pump 30 and fuel injector 38 pulses. As one of ordinary skill in the art appreciates, such pressure pulsations can, if not compensated for, affect the metering accuracy of the fuel injectors 38. Positioning the accumulator 54 in direct fluid communication with fuel rail 34 combined with active control of accumulator valve 58 via controller 70 provides capability for attenuating such pressure pulsations. In particular, rapid actuation of the accumulator valve 58 by controller 70 provides for absorbing a high pressure portion of a waveform of the pressure pulsations and returning pressurized fuel from accumulator 54 during a low portion of the pressure pulsation waveform. Thus, the accumulator 54 can be controlled via controller 70 and solenoid valve 58 to deliver pressure-smoothing fuel flow that is actively and synchronously applied to smooth the fuel rail pressure waveform.

If an accumulator was positioned such that it was upstream of the positive displacement pump and/or not in direct fluid communication with the fuel rail (e.g. upstream of various other throttling and/or regulating valves), such attenuation would not be effective. Further, passive accumulators can only be tuned for one resonant frequency (e.g., its most effective pulse absorption frequency) and are thus not effective for the pressure pulsations that vary in frequency with corresponding engine speed variations.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A direct injection fuel supply system for a vehicle, comprising:
   a lift fuel pump adapted to be in fluid communication with a supply of fuel;
   a positive displacement pump in fluid communication with and downstream of the lift fuel pump;
   at least one fuel injector in fluid communication with an outlet of the positive displacement pump via a high pressure fuel line;
   an accumulator assembly including an accumulator and a valve, the valve being in fluid communication with the high pressure fuel line and the at least one fuel injector, the accumulator fluidly coupled to the high pressure fuel line downstream of the positive displacement pump;
   wherein the valve is configured to be controlled to at least one of an open state providing fluid communication between the accumulator and the high pressure fuel line and a closed state blocking fluid communication between the accumulator and the high pressure fuel line;
   a one-way check valve disposed in the high pressure fuel line downstream of the positive displacement pump; and
   a high pressure branch line branching from the high pressure fuel line at a point downstream of the positive displacement pump and between the positive displacement pump and the at least one fuel injector;
   wherein the accumulator and the accumulator valve are disposed on the high pressure branch line, the accumulator valve being in fluid communication with the high pressure fuel line downstream of the check valve.

2. The fuel supply system of claim 1, wherein the accumulator valve is in fluid communication with the accumulator and the at least one fuel injector in a high pressure section of the direct injection fuel supply system.

3. The fuel supply system of claim 1, wherein the positive displacement pump is an engine driven positive displacement pump and the lift fuel pump is an electric fuel pump positioned in or proximate to a fuel tank.

4. The fuel supply system of claim 3, wherein the positive displacement pump is downstream of the lift fuel pump and configured to raise a pressure of fuel received from the lift pump at a low pressure to a high pressure in the high pressure fuel line.

5. The fuel supply system of claim 4, wherein the low pressure fuel is on an order of 4 bar and wherein the high pressure fuel is on an order of 200 bar for use with direct injection fuel injectors.

6. The fuel supply system of claim 1, further comprising:
   a pressure sensor in fluid communication with the high pressure fuel line proximate the at least one fuel injector; and
   a spill valve in fluid communication with a low pressure fuel supply line between the positive displacement pump and the lift fuel pump,
   wherein the spill valve and the valve of the accumulator assembly are solenoid valves.

7. The fuel supply system of claim 6, further comprising a controller in communication with the pressure sensor, accumulator valve, spill valve, the lift fuel pump and an engine, the controller configured to control a position of the accumulator valve and spill valve as well as operation of the lift fuel pump based at least on an operating state of the engine.

8. The fuel supply system of claim 7, wherein upon the controller determining the engine is operating in a deceleration state, the controller commands the accumulator valve to open upon which high pressure fuel from the positive displacement pump flows into the accumulator.

9. The fuel supply system of claim 7, further comprising:
   determining, at the controller, that an engine shutdown has been initiated;

commanding, by the controller, the accumulator valve to open to harvest fuel pumped from the positive displacement pump as the engine coasts down to zero speed; and commanding, by the controller, the accumulator valve to close upon determining the engine has fallen below a predetermined speed proximate zero speed to store pressurized fuel within the accumulator.

10. The fuel supply system of claim 9, further comprising:

commanding, by the controller, the lift pump to an on state and the spill valve to open upon determining the engine is under a restart event such that fuel from the lift pump flows out of the spill valve prior to the positive displacement pump; and commanding, by the controller, the accumulator valve to open thereby delivering high pressure fuel directly to the at least one injector for direct fuel injection associated with the restart event.

11. The fuel supply system of claim 10, wherein the high pressure fuel delivered to the at least one injector is solely from the accumulator and capable of providing an adequate supply of fuel to support the engine restart event.

12. A method for controlling a direct injection fuel supply system, comprising:

monitoring, by a controller, an operating state of an engine;

determining, by the controller, that the engine is operating in a deceleration state;

commanding, by the controller, an accumulator valve fluidly coupled to an accumulator to open to allow pressurized fuel from a mechanically driven positive displacement pump to flow into the accumulator, the accumulator and the accumulator valve fluidly coupled to a high pressure fuel line that is in fluid communication with an output of the displacement pump, the high pressure fuel line coupled to at least one fuel injector, the accumulator and the accumulator valve fluidly coupled to the high pressure line at a point downstream of the positive displacement pump;

commanding, by the controller, the accumulator valve to close at or proximate an end of the deceleration or shutdown state thereby storing pressurized fuel in the accumulator;

wherein the accumulator valve is fluidly coupled to the high pressure fuel line in fluid communication with the at least one fuel injector and, when commanded to open by the controller, allows the accumulator to supply pressurized fuel to the at least one fuel injector;

commanding, by the controller, a spill valve to open and the accumulator valve to open thereby supplying the pressurized fuel from the accumulator to the at least one fuel injector and not supply fuel from the displacement pump.

13. The method according to claim 12, further comprising:

monitoring a pressure of the high pressure fuel line; and commanding, by the controller, the accumulator valve to close and the spill valve to close upon determining the pressure in the high pressure fuel line falls below a predetermined nominal fuel injector pressure.

14. The method of claim 12, further comprising:

monitoring pressure in the high pressure fuel line to sense pressure pulsations caused, at least in part, by the displacement pump and the at least one injector; and actively controlling the accumulator valve to attenuate the pressure pulsations.

15. The method of claim 14, wherein actively controlling the pressure pulsations includes:

commanding, by the controller, the solenoid valve to open during a high pressure portion of the pressure pulsation to absorb an increase in pressure in the high pressure fuel line associated with the high pressure portion; and commanding, by the controller, the solenoid valve to open during a low pressure portion of the pressure pulsation to return pressurized fuel from the accumulator to the high pressure fuel line, the returned pressurized fuel having a greater pressure than the pressure in the high pressure fuel line at the low pressure portion of the pressure pulsation.

16. A method for controlling a direct injection fuel supply system, comprising:

monitoring, by a controller, an operating state of an engine;

determining, by the controller, that the engine is operating in a deceleration state or a shutdown state;

commanding, by the controller, an accumulator valve fluidly coupled to an accumulator to open to allow pressurized fuel from a mechanically driven positive displacement pump to flow into the accumulator, the accumulator and the accumulator valve fluidly coupled to a high pressure fuel line that is in fluid communication with an output of the displacement pump, the high pressure fuel line coupled to at least one fuel injector, the accumulator and the accumulator valve fluidly coupled to the high pressure line at a point downstream of the positive displacement pump; and commanding, by the controller, the accumulator valve to close at or proximate an end of the deceleration or shutdown state thereby storing pressurized fuel in the accumulator;

wherein the accumulator valve is fluidly coupled to the high pressure fuel line in fluid communication with the at least one fuel injector and, when commanded to open by the controller, allows the accumulator to supply pressurized fuel to the at least one fuel injector, determining that the engine is operating in a steady state outside of the deceleration state or shutdown state;

comparing a pressure of the stored pressurized fuel in the accumulator with a predetermined nominal injection pressure; and commanding, by the controller, the lift pump to an off state and the accumulator valve to open thereby supplying the stored pressurized fuel from the accumulator to the at least one fuel injector independent of the displacement pump.

17. The method of claim 16, further comprising:

monitoring a pressure of the high pressure fuel line after the accumulator valve is commanded to open and, upon determining the pressure of the high pressure fuel line falls below a predetermined nominal injector pressure, commanding the accumulator valve to close and the lift pump to an on state.

* * * * *